E. G. EDMONSON.
PAD STUFFING MACHINE.
APPLICATION FILED AUG. 18, 1917.
1,272,027.
Patented July 9, 1918.
3 SHEETS—SHEET 1.
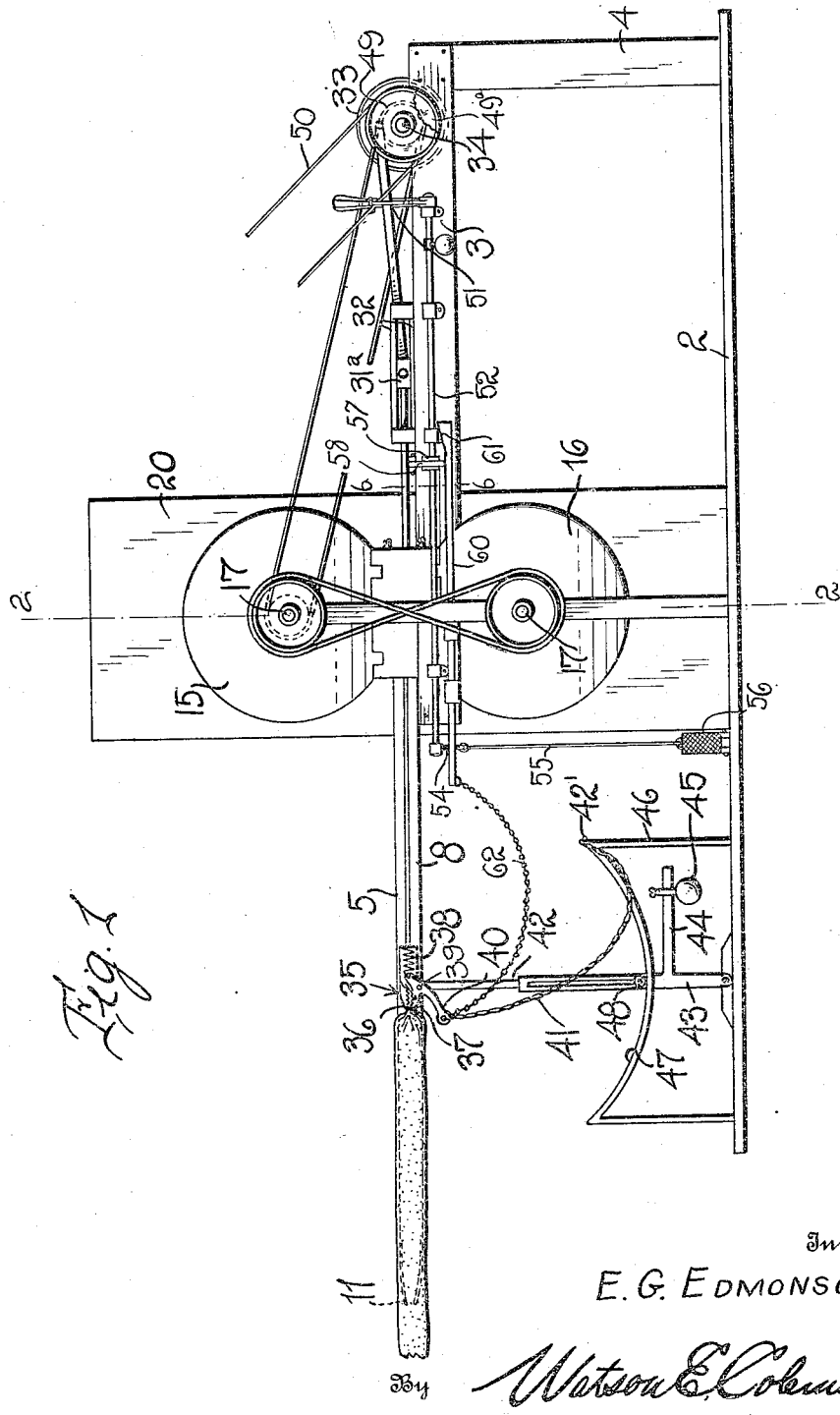
Inventor
E. G. EDMONSON
By Watson E. Coleman
Attorney

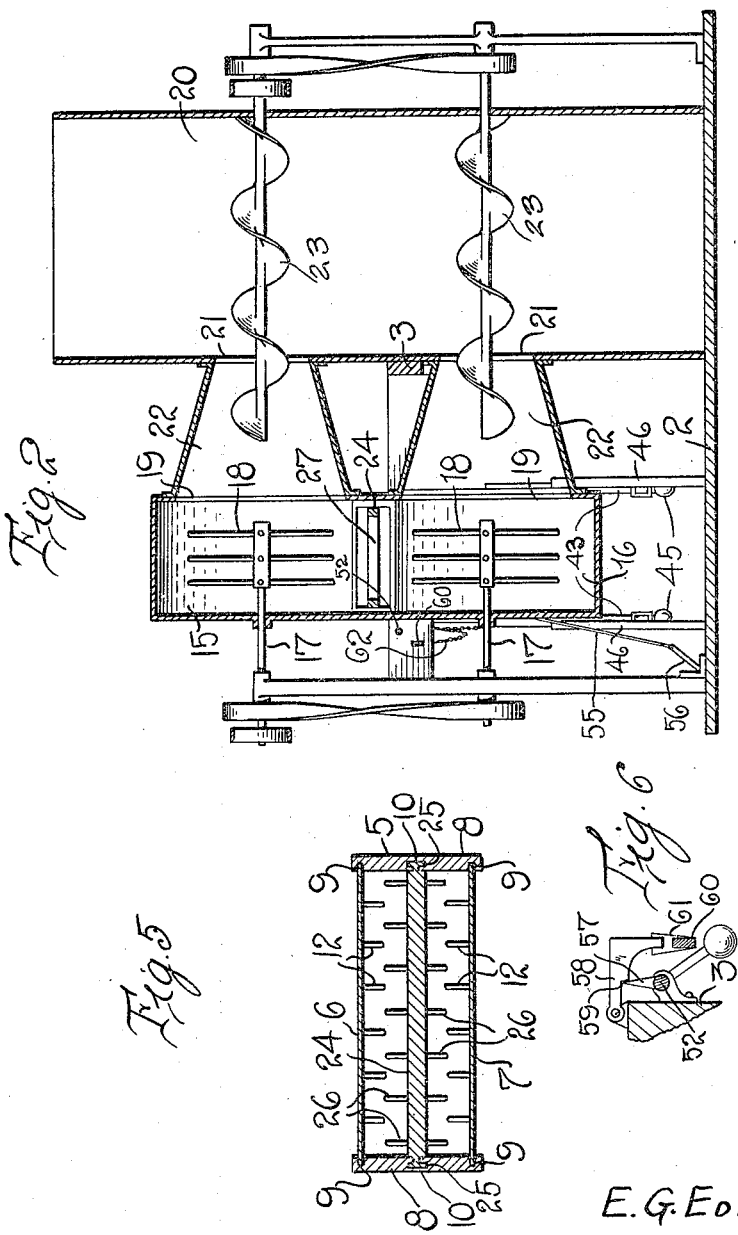

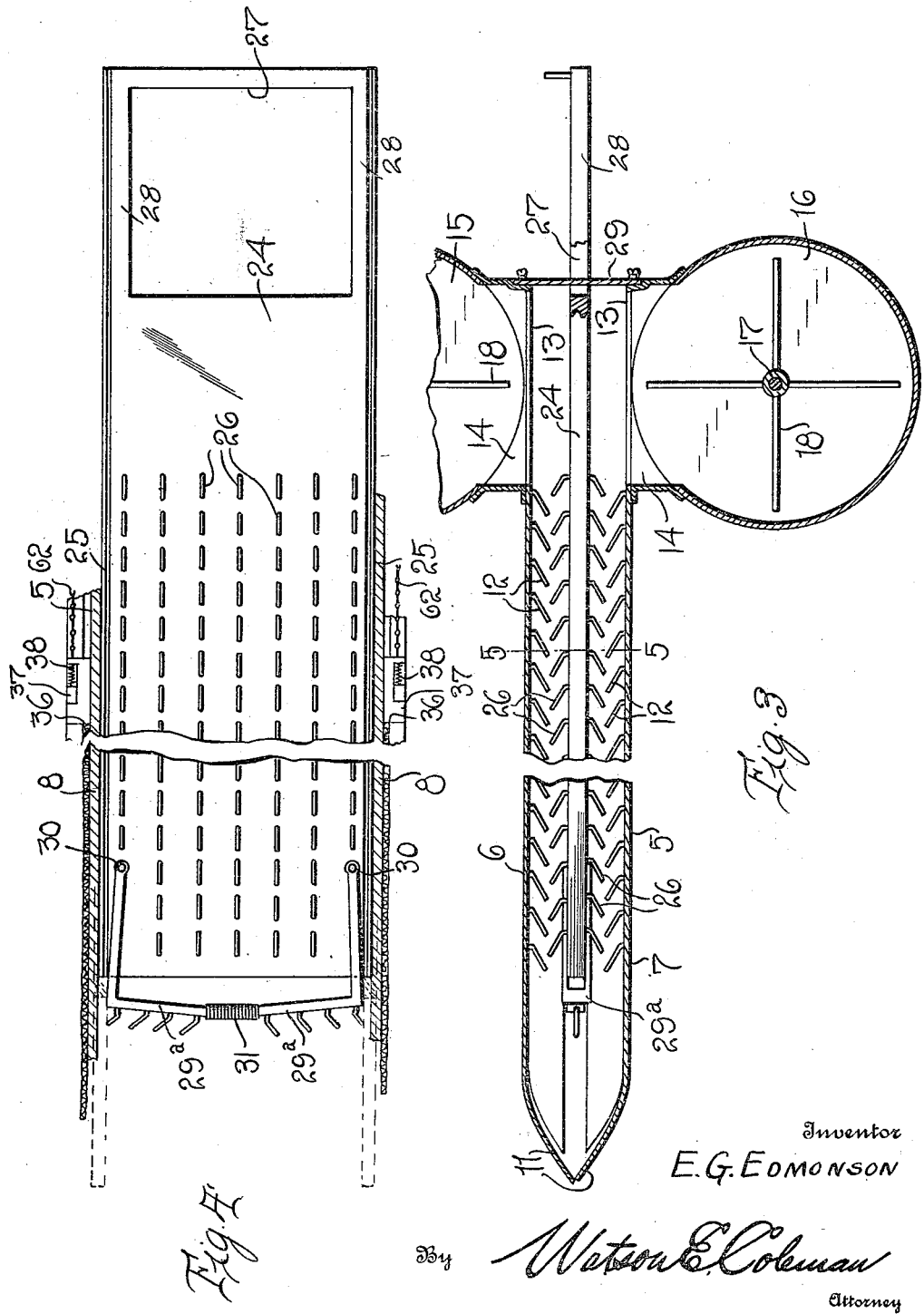

UNITED STATES PATENT OFFICE.

ELLIS G. EDMONSON, OF GREENFIELD, OHIO, ASSIGNOR TO THE AMERICAN PAD & TEXTILE COMPANY, OF GREENFIELD, OHIO, A CORPORATION OF OHIO.

PAD-STUFFING MACHINE.

1,272,027.

Specification of Letters Patent.

Patented July 9, 1918.

Application filed August 18, 1917. Serial No. 186,950.

*To all whom it may concern:*

Be it known that I, ELLIS G. EDMONSON, a citizen of the United States, residing at Greenfield, in the county of Highland and State of Ohio, have invented certain new and useful Improvements in Pad-Stuffing Machines, of which the following is a specification, reference being had to the accompanying drawings.

This invention relates to machines for stuffing pads, such as sweat pads for horses, and particularly to stuffing machines of the general character described in the patent to A. E. McClain, granted October 6, 1914, No. 1,112,545.

The primary object of my invention is the provision of a machine of this character, so constructed that it will feed and pack shoddy or like stuffing material uniformly within the pad so that the stuffing material shall have a uniform consistency throughout the pad.

A further object of my invention is to simplify the mechanism for this purpose, make it more effective, and so construct it that it may work more rapidly.

A further object of the invention is the provision of a stuffing plunger so constructed that it will receive and engage with shoddy or other stuffing material on both of its faces so that the pad will be packed both as regards its upper portion and its lower portion, thus increasing the uniformity of the stuffing within the pad.

A further object of the invention is to provide means for holding the pad in place upon the "conveyer," to provide automatic devices for releasing the pad from the conveyer after it has been filled or stuffed, and at the same time automatically disengage the machine from its power and to provide a packing plunger which is so constructed that it will thoroughly compress the material within the bag.

A further object of the invention is to provide very simple means for regulating the tension on the bag.

Other objects will appear in the course of the following description.

My invention is illustrated in the accompanying drawings, wherein:

Figure 1 is a side elevation of a pad stuffing machine constructed in accordance with my invention;

Fig. 2 is a transverse section on the line 2—2 of Fig. 1;

Fig. 3 is a longitudinal sectional view of the stuffing casing, a portion of the drums and pickers being also shown;

Fig. 4 is a plan view of the packing plunger;

Fig. 5 is a section on the line 5—5 of Fig. 3.

Fig. 6 is a fragmentary section on the line 6—6 of Fig. 1.

Referring to the drawings, it will be seen that for the support of the bag stuffing mechanism I provide a supporting frame including the base 2, the longitudinal supporting beams 3, and the legs 4. Mounted upon the forward ends of the beams 3 and projecting forward therefrom is the conveyer casing 5. This conveyer casing, as illustrated in Fig. 5, consists of the upper and lower walls 6 and 7 and the side walls 8. These side walls may be formed in any suitable manner, but as illustrated each side wall adjacent its upper and lower margins is provided with grooves 9 adapted to receive the edges of the walls 6 and 7, and each side wall is also formed with a longitudinally extending groove 10, this groove being T-shaped in cross section. The casing 5 extends out a distance equal to the length of the pad to be stuffed, and at its outer end the plates 6 and 7 which form the top and bottom walls of the casing, are converged as at 11. These converging ends are somewhat resilient so as to open out to pressure of shoddy or other stuffing material compressed within the casing and close when this pressure has been reduced.

The inner faces of the upper and lower plates 6 and 7 are formed with a plurality of teeth 12, these teeth extending forward. The walls 6 and 7 or their rear ends are cut away at 13 to aline with trunks 14 extending from or connecting the oppositely disposed drums 15 and 16. Disposed within these drums 15 and 16 are the rotatable shafts 17 carrying upon them a plurality of radially extending pickers 18. These drums may be connected to each other in any suitable manner so as to rotate in reverse directions. The inner wall of each drum has an opening 19. Mounted upon the base 2 to one side of the drums 15 and 16 is a casing 20 open at its upper end and designed to contain the material with which the pads are intended to be stuffed. This material is usually shoddy or something of the same character. The wall of the casing 20 adjacent to the drums 15 and 16 is provided with openings 21, and from these openings 21 extend the flaring trunks 22 which communicate with the openings 19 in the drums. Extending transversely across this casing 20 and disposed in alinement with the axes of the drums are the screw conveyers 23 which are operated in any suitable manner and act to convey material from the casing 20 into the trunks 22 and thence into the drums 15 and 16.

The conveyer casing 5 is firmly supported upon the supporting frame, and reciprocatively mounted within the conveyer casing is a packing plunger comprising a transversely extending member 24 having a width approximately that of the casing 5 and having its edges so formed, as at 25, that they will engage with T-shaped slots 10 in the side walls of the casing 5. Thus the plunger is held in the middle of the casing. The upper and under faces of this plunger 24 are provided with the forwardly inclined spurs or prongs 26 which are preferably arranged in staggered relation to the spurs or prongs 12. These spurs or prongs 12 and 26 are slightly yieldable or resilient.

The rear end of the plunger is formed with a square opening 27, as shown in Fig. 4. In other words, the rear end of the plunger is formed like a yoke, and the two arms 28 of the yoke pass through openings in a head 29 which is detachable from but normally closes the rear end of the casing or chamber 5. At its forward end the plunger 24 is provided with a pair of packing members 29$^a$. These packing members are angular in form and have their rear portions hinged at 30. A spring 31 throws the packers outward as the conveying plunger or packing plunger moves forward. The side walls of the casing 5 are formed each with a slot through which the packing members 29$^a$ open out as the device moves forward. The packing plunger 24 reciprocates within the casing 5, as previously described, and to this end the rear end of the packing plunger is operatively connected to a cross head 31$^a$ moving between guides 32, this cross head being in turn operatively connected to a crank wheel 33 on a shaft 34 and driven in any suitable manner.

The operation of this part of my invention will be obvious. As the plunger moves back the shoddy or other packing material is fed to the teeth or prongs 26 by the pickers or fingers 18. As the plunger moves forward this material which is caught by the prongs at the rear end of the plunger will be carried forward, and on the return movement of the packing member this material will be caught by the prongs 12 at the rear end of the casing. The constant reciprocation of the packing plunger will feed the shoddy or other material forward step by step until eventually it is engaged by the packing members 29$^a$ and forced out of the casing and into the pad desired to be filled.

The pad desired to be filled is open at one end. This open end is disposed over the forward end of the casing 5 and the pad drawn over said casing until the forward end of the casing is adjacent to the closed end of the pad. For the purpose of yieldingly holding the pad in place upon the casing but allowing it to be forced off of the casing as it is gradually filled with material, I provide oppositely disposed bag engaging members 35 which are slidably mounted upon the side walls of the casing 5. Each of these bag engaging members embodies a fixed jaw 36 and a jaw 37 pivoted to the bag engaging member and urged into engagement with the fixed jaw by means of a spring 38. The movable jaw is pivoted at 39 and has an outwardly extending arm 40 which is connected by means of a chain 41 to any suitable fixed point 42'. This chain 41, when the pad is first placed upon the machine, is slack and remains slack until the pad has been stuffed and moved forward as a consequence upon the casing. Then this chain is rendered taut and the jaws are opened and the pad released. In order to yieldingly urge the pad in the direction of the drums 15 and 16 and thus yieldingly resist the outward movement of the pad as it is stuffed and thus regulate the degree to which the material within the pad can be compressed, I provide standards 42 disposed on each side of the casing 8, each of the standards being made in two sections having telescopic engagement with each other. The lower section 43 is pivotally mounted upon the base of the machine or in any other suitable manner.

Extending from the member 43 is an arm 44 carrying an adjustable weight 45. It will be seen that the tendency of this weight 45 is to rock the standard so that its upper end will be carried toward the drums 15 and 16. Therefore, the outward movement of the pad as it is stuffed will be made against the force of this counter-weight 45, and by adjusting the counter-weight upon the arm 44 the degree of tension thus placed upon the bag may be readily regulated. In order to shorten and lengthen the telescopic standard as the standard moves from a vertical plane to an inclined position on one side or the other of its pivotal point, I may provide a member 46 having a curved surface 47 upon which a roller 48 rides, this roller acting as it rolls up the surface 47 in either direction to extend the standard and at the same time support the casing 5 through the bag holders 35 which have sliding engagement with the casing.

The operation of the invention is as follows: The pad to be stuffed, which is left open at one end, is inserted over the casing 5 and engaged by the bag holders 35. The bag holders are at their rearmost position upon the casing 5, that is, are adjacent to the trunks 14. The telescopic standards are extended and the chain 41 is slack. The plunger is now reciprocated and as it reciprocates the stuffing is carried into the casing and carried forward and eventually discharged into the closed end of the pad. Little by little the pad is moved forward upon the casing, the pad holders sliding upon the casing, until the pad is completely filled. At this time the telescopic standard is inclined upward and forward and the chain just becomes taut. As soon as the chain tightens sufficiently it trips the pad holders and the pad is released. The weight 45 then acts to return the pad holders to their original position and a new pad is inserted upon the casing 5 and engaged with the pad holders.

At the time that the chain tightens sufficiently to trip the pad holders, the machine is thrown out of gear by a mechanism which will be now described, or by any suitable mechanism.

Mounted upon the shaft 34 is a fast and a loose pulley, the loose pulley being designated 49. A belt 50 operates on these fast and loose pulleys and is shifted from the fast pulley to the loose pulley and vice versa by means of a forked belt shifting arm 51 which as usual engages the opposite edges of the belt. This arm 51 is mounted upon a longitudinally disposed shaft 52 mounted in suitable bearings upon the beam 3 and at its forward end this shaft is provided with the arm 54 connected by means of a link 55 to a pedal 56 whereby the shaft 52 may be manually rotated. Mounted upon the shaft 52, as illustrated in Fig. 6, is a finger 57 and pivotally mounted upon the beam 3 is a detent 58 having a shoulder 59 against which the finger normally bears. When the finger 57 is disposed in a vertical position, as illustrated in Fig. 6, the belt 50 is on the fast pulley. When, however, the detent rises, the shaft 52 may be turned in a clockwise direction (Fig. 6), shifting the belt 50 from the fast to the loose pulley and thus stopping the machine. This rotation of the shaft 52 may be accomplished by a weighted arm which will urge the shaft in a counter-clockwise direction when it is released from the detent 58. The detent 58 is automatically released from its engagement with the finger 57 when the pad has been fully stuffed by means of a longitudinally slidable rod 60 having at its end an upwardly inclined face 61. The forward extremity of this rod 60, which rod is slidingly mounted in suitable supports on the beam 3, is connected by a chain 62 to the arm 40. Now when the clamping member 35 has moved forward to such an extent as to tighten the chain 62, it will draw the rod 60 forward, cause the inclined face 61 to engage beneath the depending end of the detent 58, raise this detent, and the shaft 52 will rotate in such a direction as to shift the belt from the fast to the loose pulley. The machine then comes to a stop, the pad is removed and then, after the clamping devices have been shifted back to their initial positions, the pedal 56 is operated to shift the finger 57 back to its original position where it is caught by the shoulder 59.

One of the advantages of this pad stuffing machine is that it stuffs from the bottom and top at the same time. If the pad were stuffed all from one side, the dirt and trash from the stuffing would accumulate at the bottom of the pad. By stuffing the pad from the top and from the bottom at the same time, the dirt and trash is forced to the center of the pad. Therefore, in the use of a pad stuffed with my machine, the dirt does not come in contact with the horse's shoulders. Furthermore, by stuffing it from the top and bottom at the same time, twice the amount of material is forced into the pad during the same period of operation.

The function of the opening 27 and the slide 24 is very important. This opening adjusts the amount of stuffing material within the stuffing chamber between the two drums 15 and 16. Thus if there is too much stuffing on top of the slide it will fall through the opening 27 to the under side of the slide and make the stuffing uniform and if there is more stuffing on the bottom of the slide than on the top, stuffing will be driven upward and the stuffing will be uniform.

Having described my invention, what I claim is:

1. In an apparatus of the character described, a casing, means for moving padding material through said casing, means arranged to engage the article to be stuffed and to hold it upon said casing, means for yieldingly restraining the movement of said article relative to the casing as it is being stuffed, means for disengaging said engaging means from the article after the article has been stuffed, and means for supporting said casing and movable with the article to be stuffed.

2. In a machine of the character described, a casing arranged to be inserted within the article to be stuffed and having forwardly extending prongs on opposite walls, and a packing plunger reciprocable within the casing and having outwardly and forwardly extending prongs on its opposite side faces confronting the pronged walls of the casing.

3. In a stuffing mechanism of the character described, a casing insertible in the article to be stuffed, said casing being rectangular in cross section and having inwardly and forwardly extending prongs upon opposite walls, and a plunger reciprocating through the casing and including a relatively flat plate having a width approximately the width of the casing and having outwardly and forwardly extending resilient prongs mounted upon opposite faces and confronting the prongs on the casing but being disposed in staggered relation thereto.

4. In a stuffing machine of the character described, a casing insertible within the article to be stuffed and open at its rear end and having a discharge opening at its forward end, a plunger operating through the middle of said casing and having opposite faces spaced from the confronting faces of the casing, the opposite faces of the plunger having forwardly extending teeth and the confronting faces of the casing having forwardly extending teeth, means for reciprocating the plunger, and means for feeding stuffing material into the rear of the casing on the opposite sides of the plunger, whereby to equalize stuffing in said article.

5. In a stuffing mechanism, a casing insertible into the article to be stuffed and having oppositely disposed openings at its rear end, a flat packing plunger reciprocable through said casing and extending transversely across the same, the plunger being provided upon its opposite faces with forwardly projecting prongs and the confronting walls of the casing being also provided with forwardly projecting prongs, means for reciprocating the plunger, and means for feeding packing material into the openings on each side of the plunger.

6. In a stuffing machine, a casing insertible into the article to be stuffed and having oppositely disposed openings at its rear end, a flat packing plunger reciprocable through said casing and having means upon its opposite faces for engaging the stuffing material, the walls of the casing also having means for retaining stuffing material from rearward movement, means for reciprocating the plunger, oppositely disposed drums communicating with the openings in the casing, and rotatable feeding members mounted in said drums adapted to carry material into the casing.

7. In a stuffing machine, a casing insertible into the article to be stuffed and having oppositely disposed openings at its rear end, a flat packing plunger reciprocable through said casing and having means upon its opposite faces for engaging the stuffing material, the walls of the casing also having means for retaining stuffing material from rearward movement, means for reciprocating the plunger, oppositely disposed drums communicating with the openings in the casing, and means for feeding packing material into said drums.

8. In a stuffing machine, a casing insertible into the article to be stuffed and having oppositely disposed openings at its rear end, a flat packing plunger reciprocable through said casing and having means upon its opposite faces for engaging the stuffing material, the walls of the casing also having means for retaining stuffing material from rearward movement, means for reciprocating the plunger, oppositely disposed drums communicating with the openings in the casing, and means for feeding packing material into said drums, said means including screw conveyers disposed in operative relation to the drums.

9. In a stuffing machine, a casing insertible into the article to be stuffed, the forward end of the casing being formed with oppositely disposed convergent members, and a packing plunger reciprocable within the casing.

10. In a stuffing machine, a casing insertible into the article to be stuffed, said casing being rectangular in cross section and provided upon its opposite faces with forwardly directed prongs, a packing plunger reciprocable within the casing and having a width equal to that of the casing and being formed upon its opposite faces with forwardly projecting prongs, the walls of said casing at its forward end being outwardly yieldable to pressure from within the casing and the side walls of the casing at its forward end being longitudinally slotted, and packing members hingedly mounted upon the forward end of the plunger and resiliently urged outward through said slots as the plunger moves forward.

11. A stuffing machine comprising a casing insertible into the article to be stuffed, said casing being rectangular in cross section and provided upon its opposite faces with forwardly directed teeth, a packing plunger reciprocable within the casing, and having a width equal to that of the casing and being formed upon its opposite faces with forwardly projecting teeth, the walls of the casing at its forward end being longitudinally slotted, and packing members hingedly mounted upon the forward end of the plunger and resiliently urged outward laterally through said slots as the plunger moves forward.

12. In a stuffing mechanism of the character described, a casing operatively supported at the rear end and adapted to be inserted into the article to be stuffed, means for feeding material through said casing and ejecting it from the forward end thereof, means sliding upon the casing for engaging the article to be stuffed, a lever operatively connected at one end to said engaging means and movable at said end therewith, and means engaging the said lever for yieldingly resisting its movement toward the forward end of the casing.

13. In a stuffing mechanism of the character described, a casing operatively supported at its rear end, means for forcing packing material through the casing and ejecting it from the forward end thereof, an article holding device longitudinally shiftable upon said casing, and means for restraining the forward movement of said article holding device comprising a member pivoted at its lower end and operatively connected at its upper end to said article holding device, an arm extending out from said member, and a weight adjustably mounted upon said arm.

14. In a stuffing mechanism, a casing insertible into the article to be stuffed and operatively supported at its rear end, means for feeding stuffing material through said casing and ejecting it at its forward end, an article engaging device slidingly mounted upon said casing, a telescopic member pivotally supported at its lower end and having operative engagement at its upper end with said holding device, said telescopic member being formed in two sections, a track upwardly curved at its ends, the middle of the track being disposed above the pivotal center of the telescopic member, and a projecting member upon the upper section of the telescopic member engageable with said track whereby to automatically lengthen the member as the member moves upon its pivotal center.

15. In a stuffing machine, a casing insertible into the article to be stuffed and having oppositely disposed openings at its rear end, a packing plunger reciprocable through said casing and having means on its opposite faces for engaging the stuffing material, oppositely disposed drums communicating with the openings in the casing, and feeding members mounted in said drums adapted to carry material into the casing, the rear end of the plunger being formed with an opening adapted to register with the openings in said casing and to permit the passage of stuffing material from one side of the packing plunger to the other.

16. A stuffing machine including a casing insertible into the article to be stuffed, a packing plunger reciprocable through said casing having means on its opposite faces for engaging the stuffing material, the confronting faces of the casing having means for retaining the stuffing material from rearward movement, the rear end of the plunger being formed with an opening extending transversely to the side faces of the plunger, and means for feeding stuffing material into the rear end of the casing, said opening permitting the passage of stuffing material from one side of the packing plunger to the other.

17. A stuffing machine comprising a casing insertible into the article to be stuffed, said casing being rectangular in cross section, a relatively flat plunger reciprocable through said casing, there being means on the opposite faces of the plunger for carrying stuffing material forward, means on the confronting faces of the casing for preventing rearward movement of the stuffing material, and means for feeding stuffing material into the rear end of the casing on opposite sides of the plunger.

18. In a stuffing mechanism of the character described, a casing insertible into the article to be stuffed and operatively supported at its rear end, drums operatively connected to the casing and discharging thereinto, feeding means disposed within the drums, a plunger reciprocable through the casing, article engaging devices slidingly mounted upon the casing, means for reciprocating the plunger and for driving the feeding means, and means operatively connected to said article engaging means for stopping the operation of the feeding means and plunger when the article engaging means is moved forward a predetermined distance.

19. In a stuffing mechanism of the character described, a casing insertible into the article to be stuffed and operatively supported at its rear end, means for feeding the stuffing material into said casing, a plunger reciprocable through the casing, power operated means for reciprocating the plunger and operating said feeding means, sliding members mounted upon the casing and having article engaging clamps thereon, a rock shaft having a finger, a detent normally holding the finger in a predetermined position, a movable releasing member adapted to raise said detent to permit the shifting of the rock shaft and the disengagement of the operating means from the feeding and plunger reciprocating means, means connecting the said releasing member with one of said sliding members on the casing, and causing the operation of the releasing member when the sliding member is moved a predetermined distance, and manually operable means for resetting the rock shaft.

20. A stuffing machine including a casing having its oppositely disposed side walls longitudinally slotted at its discharge end, a plunger reciprocable through the casing, packing members hingedly mounted upon the forward end of the plunger adjacent each side margin thereof, said packing members being angular in form to provide portions extending approximately parallel to the side edges of the plunger and transversely thereto, laterally directed teeth mounted upon the transverse portions of the packing members, and resilient means urging said packing members laterally outward.

21. A stuffing machine of the character described comprising a casing operatively supported at its rear end and adapted to be inserted within the article to be stuffed, means for forcing stuffing material through the casing and ejecting it through the forward end thereof, article holding devices longitudinally shiftable upon said casing, means for restraining the forward movement of said article holding devices, and means for supporting the casing under the weight of the stuffed article, said supporting means being connected to the article holding means and moving forward therewith.

22. A stuffing machine of the character described comprising a casing operatively supported at its rear end and adapted to be inserted within the article to be stuffed, means for forcing stuffing material through said casing and ejecting it at its forward end, and means for yieldingly resisting the forward movement of the article as it is stuffed and for supporting the casing under the weight of the article, said means moving forward upon the casing as the article is stuffed.

23. In a stuffing machine of the character described, a casing insertible within the article to be stuffed and having a discharge opening at its forward end, a plunger operating through said casing, and means for feeding material into the rear end of said casing at a plurality of points whereby to equalize the disposition of the stuffing material within the casing.

24. A stuffing machine of the character described comprising a casing insertible into the article to be stuffed and operatively supported at its rear end, means for forcing stuffing material through said casing and ejecting it at its forward end, a support for the casing shiftable therealong, and means carried by said support for engaging the open end of the article being stuffed.

25. A stuffing machine of the character described comprising a casing adapted to be inserted within the article to be stuffed and operatively supported at its rear end, means for forcing stuffing material through said casing and ejecting it at its forward end, supporting means engaging the casing and shiftable longitudinally upon the casing, means restraining the forward movement of the supporting means upon the casing, and means carried by said supporting means for engaging the open end of the article to be stuffed.

26. A stuffing machine of the character described including a casing operatively supported at its rear end and adapted to be inserted within the article to be stuffed, said casing being approximately rectangular in cross section and having grooved side walls and upper and lower walls inserted in said grooves of the side walls, and a plunger reciprocable within the casing, the edges of the plunger and the adjacent faces of the side walls being formed one with tongues and the other with grooves whereby the plunger shall be guided through the casing.

In testimony whereof I hereunto affix my signature in the presence of two witnesses.

ELLIS G. EDMONSON.

Witnesses:
J. L. MARGOLIUS,
F. L. BALLAND.

Copies of this patent may be obtained for five cents each, by addressing the "Commissioner of Patents, Washington, D. C."